United States Patent
Levy et al.

(10) Patent No.: US 8,228,180 B2
(45) Date of Patent: Jul. 24, 2012

(54) VEHICLE FUEL EFFICIENCY DISPLAY

(75) Inventors: Michael Joseph Levy, Berkley, MI (US); Alexander Thomas Riegelman, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 12/753,154

(22) Filed: Apr. 2, 2010

(65) Prior Publication Data

US 2011/0241861 A1   Oct. 6, 2011

(51) Int. Cl.
*B60Q 1/00* (2006.01)
*B60R 25/10* (2006.01)
*B60T 7/12* (2006.01)
*G06F 19/10* (2011.01)
*G09G 5/02* (2006.01)

(52) U.S. Cl. ............ 340/439; 340/425.5; 340/459; 340/461; 340/450.2; 340/426.1; 701/103; 701/123; 362/487; 345/646

(58) Field of Classification Search .......... 340/439, 340/425.5, 459, 461, 450.2, 426.1, 462, 436, 340/870.13, 870.16; 362/23, 27, 487, 488, 362/489, 26, 551, 615; 345/1.1, 646, 662; 701/123, 99, 103, 104

See application file for complete search history.

(56) References Cited

U.S. PATENT DOCUMENTS

| | | | |
|---|---|---|---|
| 6,092,021 A * | 7/2000 | Ehlbeck et al. | 701/123 |
| 6,453,731 B1 * | 9/2002 | Yaegashi | 73/114.52 |
| 7,237,203 B1 * | 6/2007 | Kuenzner | 715/764 |
| 7,898,405 B2 * | 3/2011 | Burke et al. | 340/461 |
| 2007/0115107 A1 * | 5/2007 | Kageyama et al. | 340/461 |
| 2007/0247291 A1 * | 10/2007 | Masuda et al. | 340/439 |
| 2008/0309475 A1 * | 12/2008 | Kuno et al. | 340/462 |
| 2010/0097202 A1 * | 4/2010 | Watanabe et al. | 340/439 |
| 2010/0207755 A1 * | 8/2010 | Watson et al. | 340/450.2 |

\* cited by examiner

*Primary Examiner* — Brian Zimmerman
*Assistant Examiner* — Mirza Alam
(74) *Attorney, Agent, or Firm* — Quinn Law Group, PLLC

(57) ABSTRACT

A fuel efficiency display for a vehicle includes a scale extending vertically on a screen with a bar superimposed over the scale to represent the instantaneous fuel efficiency of the vehicle. A numerical representation of the instantaneous fuel efficiency of the vehicle is displayed above the scale and the bar. A first marker indicating and a numerical representation of the average fuel efficiency of the vehicle over a pre-selected range is displayed on a left side of the scale and the bar. A second marker indicating a numerical representation of the greatest fuel efficiency achieved by the vehicle over the pre-selected range is displayed on a right side of the scale and the bar.

20 Claims, 1 Drawing Sheet

VEHICLE FUEL EFFICIENCY DISPLAY

TECHNICAL FIELD

The invention generally relates to an informational display for a vehicle, and more specifically to a display for conveying fuel efficiency information related to the vehicle to an operator of the vehicle.

BACKGROUND OF THE INVENTION

Vehicles include fuel efficiency displays to convey information relating to the fuel efficiency of the vehicle to the operator of the vehicle. Typically, the fuel efficiency information displayed includes the instantaneous fuel efficiency of the vehicle, the average fuel efficiency of the vehicle over a pre-determined range of the vehicle, i.e., distance traveled, and the greatest fuel efficiency achieved by the vehicle over the pre-determined range, i.e., the highest instantaneous fuel efficiency achieved.

The fuel efficiency display conveys the fuel efficiency information to the operator of the vehicle to enable the operator to understand how their driving choices and/or style affects the fuel efficiency of the vehicle, thereby allowing the operator to set and achieve fuel efficiency goals. However, the fuel efficiency information, i.e., the instantaneous fuel efficiency, the average fuel efficiency, and the greatest fuel efficiency, must be presented to the operator in a manner that is easily and quickly related to each other and understood by the operator.

SUMMARY OF THE INVENTION

A method of presenting a fuel efficiency of a vehicle on a display is disclosed. The method includes displaying a bar along a scale to indicate an instantaneous fuel efficiency of the vehicle. The method further includes displaying a first marker simultaneously with the bar along the scale and laterally offset to a first side of the bar to indicate an average fuel efficiency of the vehicle over a pre-selected range of the vehicle. The method further includes displaying a second marker simultaneously with the bar along the scale and laterally offset to a second side of the bar, opposite the first side of the bar, to indicate a greatest fuel efficiency achieved by the vehicle over the pre-selected range.

In another aspect of the invention, a fuel efficiency display for a vehicle is disclosed. The display includes a screen presenting a scale displayed in a vertical orientation. The display further includes a bar superimposed over the scale and configured for displaying an instantaneous fuel efficiency of the vehicle relative to the scale. The display further includes a first marker disposed adjacent the scale and laterally offset from a first side of the bar and configured for displaying an average fuel efficiency of the vehicle over a pre-selected range of the vehicle relative to the scale. The display further includes a second marker disposed adjacent the scale and laterally offset from a second side of the bar, opposite the first side of the bar, and configured for displaying a greatest fuel efficiency of the vehicle over the pre-selected range relative to the scale.

Accordingly, the fuel efficiency display described herein presents the instantaneous fuel efficiency of the vehicle, the average fuel efficiency of the vehicle and the greatest fuel efficiency of the vehicle achieved during a pre-selected range of the vehicle simultaneously in an easily understand fashion. The simultaneous presentation of the fuel efficiency information allows an operator of the vehicle to easily view and understand how specific driving actions affect the fuel efficiency of the vehicle, thereby allowing the operator to adjust their driving style to maximize and/or achieve other fuel efficiency goals.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
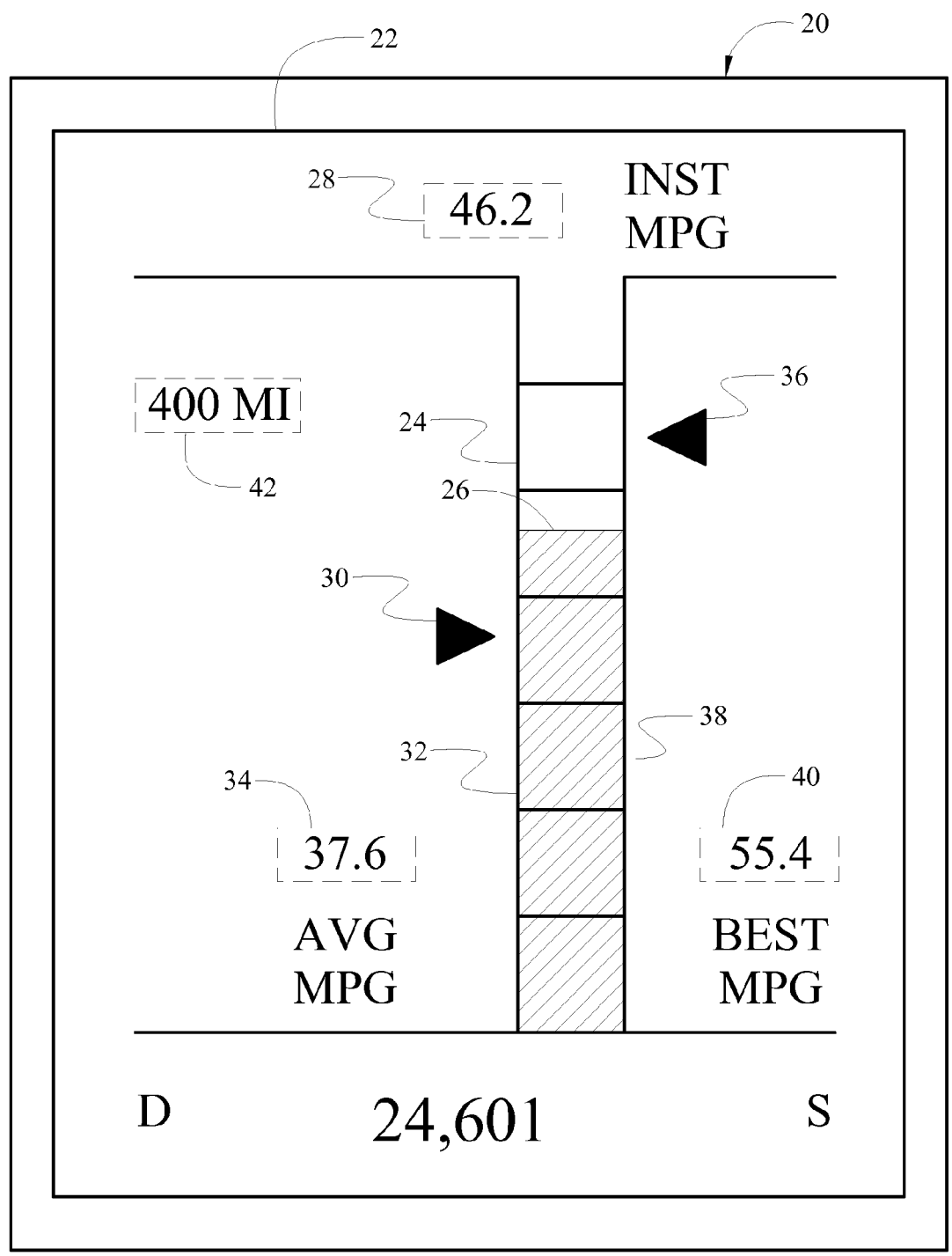
FIG. 1 is a schematic plan view of a fuel efficiency display in accordance with the invention.

Referring to FIG. 1, wherein like numerals indicate corresponding parts, a fuel efficiency display is shown generally at 20. The fuel efficiency display 20 presents, i.e., displays, fuel efficiency information related to a vehicle. The fuel efficiency display 20 is part of the vehicle, and is preferably disposed within an instrument cluster of the vehicle.

The vehicle includes a controller (not shown), which is coupled to and in communication with the fuel efficiency display 20. The controller collects data from various sensors (not shown) throughout the vehicle, and calculates the fuel efficiency information related to the vehicle. The controller also controls the fuel efficiency display 20 to present the fuel efficiency information related to the vehicle in an easily viewed and understood fashion. The specifics of the vehicle sensors, the controller, and the manner in which the controller calculates the fuel efficiency information and controls the fuel efficiency display 20 are well known in the art, and are therefore not discussed in detail herein.

The fuel efficiency display 20 includes a screen 22. The screen 22 may include a monochrome, Liquid Crystal Display (LCD). More specifically, the LCD screen 22 may include a Quarter Video Graphic Display (QVGD). However, it should be appreciated that the screen 22 may include some other type and/or configuration of screen 22 not described herein.

The screen 22 presents, i.e., displays, a scale 24. The scale 24 is a reference of the possible fuel efficiency of the vehicle, against which the fuel efficiency information of the vehicle is presented against. Preferably, the scale 24 is displayed in a vertical orientation. However, it should be appreciated that the scale 24 may be presented in a horizontal orientation, or in some other orientation not shown or described herein. As shown, the scale 24 includes a pair of vertically extending parallel lines. However, the scale 24 may be presented in some other manner.

The fuel efficiency display 20 includes a bar 26 superimposed over the scale 24. The bar 26 is configured for displaying an instantaneous fuel efficiency of the vehicle relative to the scale 24. The bar 26 is displayed against the scale 24 and is measured against the scale 24 to visually indicate a magnitude of the instantaneous fuel efficiency of the vehicle. As shown, the bar 26 is disposed between the pair of parallel lines defining the scale 24. However, it should be appreciated that the bar 26 may be presented or shown in some other manner relative to the scale 24.

The instantaneous fuel efficiency of the vehicle is the current distance traveled per unit of fuel consumption at any given time. Typically, the instantaneous fuel efficiency of the vehicle is measured in miles per gallon (mpg). The instantaneous fuel efficiency of the vehicle is continuously changing. As such, the controller is continuously calculating the instantaneous fuel efficiency of the vehicle and updating the bar 26 to present the most current value of the instantaneous fuel efficiency of the vehicle. Accordingly, it should be appreciated that the bar 26 moves relative to the scale 24 as the instantaneous fuel efficiency of the vehicle changes over time. As shown, as the instantaneous fuel efficiency of the vehicle increases, the bar 26 rises vertically relative to the scale 24. Similarly, as the instantaneous fuel efficiency of the vehicle decreases, the bar 26 falls relative to the scale 24.

The fuel efficiency display 20 includes a section, hereinafter referred to as a first section 28, which is preferably disposed adjacent an upper end of the scale 24. However, it should be appreciated that the first section 28 of the fuel efficiency display 20 may be disposed at some other location on the screen 22. The first section 28 of the fuel efficiency display 20 is configured for displaying a numerical representation of the instantaneous fuel efficiency of the vehicle. The first section 28 of the fuel efficiency display 20 is a portion of the screen 22 that is dedicated to displaying the numerical representation of the instantaneous fuel efficiency of the vehicle. As such, the first section 28 of the fuel efficiency display 20 does not move relative to the scale 24.

The fuel efficiency display 20 includes a first marker 30, preferably disposed adjacent the scale 24 and laterally offset from a first side 32 of the bar 26. The first marker 30 is configured for displaying an average fuel efficiency of the vehicle over a pre-selected range of the vehicle relative to the scale 24. The first marker 30 is displayed adjacent the scale 24 and is measured against the scale 24 to visually indicate a magnitude of the average fuel efficiency of the vehicle. As shown, the first marker 30 is shown as a right pointing triangle disposed adjacent the left side of the bar 26, and pointing to the portion of the scale 24 representing the numerical value of the average fuel efficiency of the vehicle. However, it should be appreciated that the first marker 30 may include some other shape than that shown and described herein, and may alternatively be positioned on the right side of the bar 26.

The average fuel efficiency of the vehicle is the average distance traveled per unit of fuel consumption over the pre-selected range. Typically, the average fuel efficiency of the vehicle is measured in miles per gallon. The pre-selected range is the distance an operator selects for which to measure the average fuel efficiency of the vehicle. For example, the operator may select a distance of 400 miles over which to calculate the average fuel efficiency of the vehicle. As such, the controller calculates the average fuel efficiency of the vehicle over the most recent 400 miles traveled by the vehicle. It should be appreciated that the pre-selected distance may include any desirable distance, including but not limited to, 25 miles, 50 miles, 100 miles, 200 miles or 400 miles. The average fuel efficiency of the vehicle is continuously changing. However, the average fuel efficiency of the vehicle typically changes slower than the instantaneous fuel efficiency of the vehicle. As such, the controller continuously calculates the average fuel efficiency of the vehicle and updates the first marker 30 to present the most current value of the average fuel efficiency of the vehicle. Accordingly, it should be appreciated that the first marker 30 moves relative to the scale 24 as the average fuel efficiency of the vehicle changes over time. As shown, as the average fuel efficiency of the vehicle increases, the first marker 30 rises vertically relative to the scale 24. Similarly, as the average fuel efficiency of the vehicle decreases, the first marker 30 falls relative to the scale 24.

The fuel efficiency display 20 further includes another section, hereinafter referred to as a second section 34, which is preferably disposed adjacent the first marker 30, to the left of the bar 26. However, it should be appreciated that the second section 34 of the fuel efficiency display 20 may be disposed at some other location on the screen 22. The second section 34 of the fuel efficiency display 20 is configured for displaying a numerical representation of the average fuel efficiency of the vehicle over the pre-selected range. The second section 34 of the fuel efficiency display 20 is a portion of the screen 22 that is dedicated to displaying the numerical representation of the average fuel efficiency of the vehicle. As such, the second section 34 of the fuel efficiency display 20 does not move relative to the scale 24.

The fuel efficiency display 20 includes a second marker 36, preferably disposed adjacent the scale 24 and laterally offset from a second side 38 of the bar 26. The second side 38 of the bar 26 is opposite the first side 32 of the bar 26. The second marker 36 is configured for displaying a greatest fuel efficiency of the vehicle achieved over the pre-selected range, relative to the scale 24. The second marker 36 is displayed relative to the scale 24 and is measured against the scale 24 to visually indicate a magnitude of the greatest fuel efficiency achieved by the vehicle within the pre-selected range. As shown, the second marker 36 is shown as a left pointing triangle disposed adjacent the right side of the bar 26, and points to the portion of the scale 24 representing the numerical value of the greatest fuel efficiency achieved by the vehicle within the pre-selected range. However, it should be appreciated that the second marker 36 may include some other shape than that shown and described herein, and may alternatively by positioned on the left side of the bar 26.

The greatest fuel efficiency achieved is the highest value of the instantaneous fuel efficiency calculated by the controller within the pre-selected range. For example, if the pre-selected range is selected to be 400 miles, and the highest instantaneous fuel efficiency achieved during the previous 400 miles traveled by the vehicle is calculated by the controller to be 45.3 mpg, then the greatest fuel efficiency achieved by the vehicle is equal to 45.3 mpg. The controller continuously monitors the instantaneous fuel efficiency of the vehicle, and updates the second marker 36 to present the most current value of the greatest fuel efficiency achieved within the pre-selected range. Accordingly, it should be appreciated that the second marker 36 moves relative to the scale 24 when the greatest fuel efficiency achieved is surpassed, or the previous greatest fuel efficiency achieved is no longer within the pre-selected range.

The fuel efficiency display 20 further includes another section, hereinafter referred to as a third section 40, which is preferably disposed adjacent the second marker 36, to the right of the bar 26. However, it should be appreciated that the third section 40 of the fuel efficiency display 20 may be disposed at some other location on the screen 22. The third section 40 of the fuel efficiency display 20 is configured for displaying a numerical representation of the greatest fuel efficiency of the vehicle achieved over the pre-selected range. The third section 40 of the fuel efficiency display 20 is a portion of the screen 22 that is dedicated to displaying the numerical representation of the greatest fuel efficiency achieved by the vehicle within the pre-selected range. As such, the third section 40 of the fuel efficiency display 20 does not move relative to the scale 24.

The fuel efficiency display 20 further includes another section, hereinafter referred to as a fourth section 42. The fourth section 42 of the fuel efficiency display 20 may be disposed at any location on the screen 22 that does not conflict or otherwise overlap with the scale 24, the bar 26, the first marker 30, the second marker 36, the second section 34, the third section 40 or the first section 28. The fourth section 42 of the fuel efficiency display 20 is configured for displaying a numerical representation of the pre-selected range over which the fuel efficiency of the vehicle is measured. As shown in FIG. 1, the fourth section 42 is disposed in an upper left quadrant of the screen 22, between the first section 28 and the second section 34.

In another aspect of the invention, a method of presenting a fuel efficiency of a vehicle on the fuel efficiency display 20 described above is disclosed. The method includes selecting a pre-selected range over which to measure the fuel efficiency of the vehicle. As described above, the pre-selected range is typically measured in miles, but may be measured in some other unit, such as but not limited to kilometers. The pre-selected range may include any distance over which the operator wishes to monitor and/or calculate the fuel efficiency of the vehicle. For example, selecting the pre-selected range may further be defined as selecting the pre-selected range from a group of ranges including 25 miles, 50 miles, 100 miles, 200 miles and 400 miles. It should be appreciated that the pre-selected range is not limited to and may include distances other than described herein.

The method further includes displaying a numerical representation of the pre-selected range. As described above, the numerical representation of the pre-selected range is displayed in the fourth section 42 of the screen 22. It should be appreciated that if the operator changes the pre-selected range, i.e., selects a new pre-selected range, than the numerical representation of the pre-selected range is updated as well.

The method further includes displaying a scale 24 on the screen 22. The scale 24 may be configured in any suitable manner, and is preferably segmented into proportional segments representing increasing numerical values to visually indicate the numerical value of the fuel efficiency information. As shown, the scale 24 includes a pair of parallel lines extending vertically on the screen 22. However, the scale 24 may be configured other than shown or described herein.

The method further includes displaying the bar 26 along the scale 24. The bar 26 indicates the instantaneous fuel efficiency of the vehicle. The bar 26 is correlated to the appropriate proportional segments of the scale to correspond to the numerical value of the instantaneous fuel efficiency of the vehicle. The bar 26 is continuously updated over time to represent the calculated instantaneous fuel efficiency of the vehicle at that time. As such, the bar 26 may move along the scale 24 to correlate the bar 26 with the instantaneous fuel efficiency of the vehicle. As shown, the bar 26 is disposed between the parallel lines of the scale 24. However, it should be appreciated that the bar 26 may be configured other than and displayed on the screen 22 in a different location than that shown or described herein.

The method further includes displaying a numerical representation of the instantaneous fuel efficiency of the vehicle. The numerical representation of the instantaneous fuel efficiency of the vehicle is displayed in the first section 28 on the screen 22 as described above. The numerical representation of the instantaneous fuel efficiency of the vehicle is continuously updated over time. Preferably and as shown, the first section 28 of the screen 22 and the numerical representation of the instantaneous fuel efficiency of the vehicle are disposed adjacent the upper end of the scale 24, near an upper vertical edge of the screen 22. However, it should be appreciated that the first section 28 and the numerical representation of the instantaneous fuel efficiency of the vehicle may be displayed at some other location on the screen 22.

The method further includes displaying a first marker 30. The first marker 30 is displayed simultaneously with the bar 26, and is positioned and correlated along the scale 24 to proportionally represent the numerical value of the average fuel efficiency of the vehicle. As shown, the first marker 30 is laterally offset to a first side 32, e.g., the left side, of the bar 26. The first marker 30 is continuously updated, and as such may move along the scale 24 as the average fuel efficiency of the vehicle changes over time.

The method further includes displaying a numerical representation of the average fuel efficiency of the vehicle. The numerical representation of the average fuel efficiency of the vehicle is displayed in the second section 34 of the screen 22. The numerical representation of the average fuel efficiency of the vehicle is continuously updated over time. Preferably, the second section 34 and the numerical representation of the average fuel efficiency of the vehicle are disposed adjacent to and to the left of the first marker 30. However, it should be appreciated that the second section 34 and the numerical representation of the average fuel efficiency of the vehicle may be displayed at some other location on the screen 22.

The method further includes displaying a second marker 36. The second marker 36 is displayed simultaneously with the bar 26, and is positioned and correlated along the scale 24 to proportionally represent the numerical value of the greatest fuel efficiency achieved by the vehicle over the pre-selected range. As shown, the second marker 36 is laterally offset to a second side 38 of the bar 26, opposite the first side 32 of the bar 26, e.g., a right side of the bar 26. The second marker 36 is continuously updated, and as such may move along the scale 24 as the greatest fuel efficiency achieved by the vehicle changes over time.

The method further includes displaying a numerical representation of the greatest fuel efficiency achieved by the vehicle over the pre-selected range. The numerical representation of the greatest fuel efficiency achieved by the vehicle is displayed in the third section 40 of the screen 22. The numerical representation of the greatest fuel efficiency achieved by the vehicle is continuously updated over time. Preferably, the third section 40 and the numerical representation of the greatest fuel efficiency achieved by the vehicle are disposed adjacent to and the right of the second marker 36. However, it should be appreciated that the third section 40 and the numerical representation of the greatest fuel efficiency achieved by the vehicle may be displayed at some other location on the screen 22.

While the best modes for carrying out the invention have been described in detail, those familiar with the art to which this invention relates will recognize various alternative designs and embodiments for practicing the invention within the scope of the appended claims.

The invention claimed is:

1. A method of presenting a fuel efficiency of a vehicle on a display, the method comprising:
    displaying a bar along a scale to indicate an instantaneous fuel efficiency of the vehicle;
    displaying a first marker simultaneously with the bar along the scale and laterally offset to a first side of the bar to indicate an average fuel efficiency of the vehicle over a pre-selected range of the vehicle, and
    displaying a second marker simultaneously with the bar along the scale and laterally offset to a second side of the bar, opposite the first side of the bar, to indicate a greatest fuel efficiency achieved by the vehicle over the pre-selected range.

2. A method as set forth in claim 1 further comprising continuously updating the bar, the first marker and the second marker over time relative to the scale.

3. A method as set forth in claim 2 further comprising selecting a pre-selected range of the vehicle over which to measure the fuel efficiency of the vehicle.

4. A method as set forth in claim 3 wherein selecting a pre-selected range of the vehicle is further defined as selecting a pre-selected range of the vehicle from a group of ranges including 25 miles, 50 miles, 100 miles, 200 miles and 400 miles.

5. A method as set forth in claim 3 further comprising displaying the pre-selected range.

6. A method as set forth in claim 1 further comprising displaying a numerical representation of the instantaneous fuel efficiency of the vehicle.

7. A method as set forth in claim 6 wherein the scale and the bar are arranged vertically on the display, and wherein displaying a numerical representation of the instantaneous fuel efficiency of the vehicle is further defined as displaying a numerical representation of the instantaneous fuel efficiency of the vehicle adjacent an upper end of the scale.

8. A method as set forth in claim 1 further comprising displaying a numerical representation of the average fuel efficiency of the vehicle adjacent the first marker.

9. A method as set forth in claim 1 further comprising displaying a numerical representation of the greatest fuel efficiency achieved by the vehicle over the pre-selected range adjacent the second marker.

10. A method as set forth in claim 1 wherein the display includes a liquid crystal display.

11. A method as set forth in claim 10 wherein the display includes a monochrome display.

12. A method as set forth in claim 11 wherein the display includes a quarter video graphic display.

13. A fuel efficiency display for a vehicle, the display comprising:
   a screen presenting a scale displayed in a vertical orientation;
   a bar superimposed over said scale and configured for displaying an instantaneous fuel efficiency of the vehicle relative to said scale;
   a first marker disposed adjacent said scale and laterally offset from a first side of said bar and configured for displaying an average fuel efficiency of the vehicle over a pre-selected range of the vehicle relative to said scale; and
   a second marker disposed adjacent said scale and laterally offset from a second side of said bar, opposite said first side of said bar, and configured for displaying a greatest fuel efficiency of the vehicle achieved over the pre-selected range relative to said scale.

14. A fuel efficiency display as set forth in claim 13 further comprising a first section disposed adjacent an upper end of said scale and configured for displaying a numerical representation of the instantaneous fuel efficiency of the vehicle.

15. A fuel efficiency display as set forth in claim 13 further comprising a second section disposed adjacent said first marker and configured for displaying a numerical representation of the average fuel efficiency of the vehicle over the pre-selected range.

16. A fuel efficiency display as set forth in claim 13 further comprising a third section disposed adjacent said second marker and configured for displaying a numerical representation of the greatest fuel efficiency of the vehicle over the pre-selected range.

17. A fuel efficiency display as set forth in claim 13 further comprising a fourth section configured for displaying a numerical representation of the pre-selected range over which the fuel efficiency of the vehicle is measured.

18. A fuel efficiency display as set forth in claim 13 wherein said screen includes a liquid crystal display.

19. A fuel efficiency display as set forth in claim 18 wherein said liquid crystal display includes a monochrome liquid crystal display.

20. A fuel efficiency display as set forth in claim 19 wherein said monochrome liquid crystal display includes a quarter video graphic display.

* * * * *